United States Patent
Hoogerbrugge et al.

(10) Patent No.: US 12,086,246 B2
(45) Date of Patent: Sep. 10, 2024

(54) METHOD FOR PROTECTING A MACHINE LEARNING MODEL FROM A SIDE CHANNEL ATTACK

(71) Applicant: NXP B.V., Eindhoven (NL)

(72) Inventors: Jan Hoogerbrugge, Helmond (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 17/810,424

(22) Filed: Jul. 1, 2022

(65) Prior Publication Data

US 2024/0004998 A1  Jan. 4, 2024

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
CPC ............... G06F 21/56; G06F 2221/034; H04L 63/0227; H04L 51/212; H04L 63/20
See application file for complete search history.

(56) References Cited

U.S. PATENT DOCUMENTS

| | | | | |
|---|---|---|---|---|
| 11,159,546 B1* | 10/2021 | Moore | ................ | H04L 63/1466 |
| 2012/0207298 A1* | 8/2012 | Meyer | .................... | G06F 7/725 |
| | | | | 380/28 |
| 2017/0026342 A1* | 1/2017 | Sidana | .................... | H04L 9/008 |
| 2020/0410090 A1* | 12/2020 | Baker | .................... | G06N 20/20 |
| 2021/0019403 A1* | 1/2021 | Mehta | .................... | G06N 3/045 |
| 2021/0119622 A1* | 4/2021 | Murali | .................... | H03K 19/21 |
| 2021/0374384 A1* | 12/2021 | Munkberg | ............. | G06N 3/045 |
| 2022/0075659 A1* | 3/2022 | Mohapatra | .......... | G06F 9/30123 |
| 2022/0198011 A1* | 6/2022 | Kumar | .................. | G06F 21/554 |
| 2022/0222089 A1* | 7/2022 | Joshi | .................... | G06F 16/953 |

FOREIGN PATENT DOCUMENTS

| | | |
|---|---|---|
| CN | 111597551 A | 8/2020 |
| CN | 109918951 B | 9/2020 |

OTHER PUBLICATIONS

Hu et al., "Performance and Noise Trade-off for SC-based Power Side-Channel Attack Detection Circuits," 2021 IEEE International Midwest Symposium on Circuits and Systems (MWSCAS) Year: 2021 | Conference Paper | Publisher: IEEE.*

(Continued)

*Primary Examiner* — Roderick Tolentino (57) ABSTRACT

A method is provided for protecting a machine learning (ML) model from a side channel attack (SCA). The method is executed by a processor in a data processing system. The method includes generating a first random bit. A first weighted sum is computed for a first connection between a node of a first layer and a node of a second layer of the ML model. The first weighted sum for the first connection is equal to a multiplication of the weight of the first connection multiplied by an input to the selected node. In the multiplication, one of the weight or the input is negated conditioned on a value of the random bit. A first output including the computed first weighted sum is provided to one or more nodes of a second layer of the plurality of layers.

19 Claims, 6 Drawing Sheets

(56) References Cited

OTHER PUBLICATIONS

Le et al., "A Real-Time Cache Side-Channel Attack Detection System on RISC-V Out-of-Order Processor," IEEE Access Year: 2021 | vol. 9 | Journal Article | Publisher: IEEE.*

U.S. Appl. No. 17/810,428, filed Jul. 1, 2022; "Method for Protecting a Machine Learning Model From a Side Channel Attack"; Inventor: Hoogerbrugge et al.

Batina, Lejla et al.; "CSI NN: Reverse Engineering of Neural Network Architectures Through Electromagnetic Side Channel"; 28th USENIX Security Symposium (USENIX Security 19), Aug. 14-16, 2019, Santa Clara CA.

Brosch, Manuel et al.; "Counteract Side-Channel Analysis of Neural Networks by Shuffling"; 2022 Design, Automation & Test in Europe Conference & Exhibition (Date); Mar. 14-23, 2022, Antwerp, Belgium; https://doi.org/10.23919/DATE54114.2022.9774710.

De Meyer, Lauren et al.; "Multiplicative Masking for AES in Hardware"; IACR Transactions on Cryptographic Hardware and Embedded Systems; Sep. 9-12, 2018, Amsterdam, The Netherlands; https://doi.org/10.13154/tches.v2018.i3.431-468.

Dubey, Anuj et al.; "BoMaNet: Boolean Masking of an Entire Neural Network"; ICCAD '20: Proceedings of the 39th International Conference on Computer-Aided Design; Nov. 2-5, 2020; DOI: 10.1145/3400302.3415649.

Dubey, Anuj et al.; "ModuloNET: Neural Networks Meet Modular Arithmetic for Efficient Hardware Masking"; IACR Transactions on Cryptographic Hardware and Embedded Systems; Sep. 18-21, 2022, Leuven, Belgium; doi.org/10.46586/tches.v2022.i1.506-556 (2022).

Hua, Weizhe et al.; "Reverse Engineering Convolutional Neural Networks Through Side-channel Information Leaks"; DAC '18: Proceedings of the 55th Annual Design Automation Conference, Jun. 24-29, 2018, San Francisco, CA; https://doi.org/10.1145/3195970.3196105.

Mangard, Stefan et al.; "Power Analysis Attacks: Revealing the Secrets of Smart Cards"; Section 7.3.1, pp. 176-194; Springer-Verlag US 2007.

U.S. Appl. No. 18/046,547; Inventor Jan Hoogerbrugge, et al.; "Method for Protecting a Machine Learning Model From a Side Channel Attack"; filed Oct. 14, 2022.

* cited by examiner

METHOD FOR PROTECTING A MACHINE LEARNING MODEL FROM A SIDE CHANNEL ATTACK

BACKGROUND

Field

This disclosure relates generally to machine learning (ML), and more particularly, to a method for protecting a ML model from a side channel attack (SCA).

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of a ML algorithm, which includes the model's accuracy, execution time, and storage requirements, is determined by several factors including the quality of the training data.

Protecting a ML model from copying has become a problem. There are various methods used to steal or copy an ML model. One relatively new technique used to steal a ML model from a device uses a side channel attack (SCA) on power consumption or electromagnetic emissions. Once an attacker has copied the model, it can be illegitimately used and monetized.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for protecting an ML model from a SCA. In one embodiment, the ML model includes an artificial neural network (NN). The NN may be trained on a training data set to classify input samples, for example, images. The NN includes layers of nodes connected together from a first layer to a last layer. Some or all the connections between the nodes are weighted and biased. A basic computation of a NN during inference operation produces a weighted sum. In one embodiment, in a first layer of the NN, a weighted sum is computed having either a correct weighted sum or a negation of the correct weighted sum. The computation of the correct weighted sum or its negation depends on the value of a random bit. The weighted sum computation is performed for the connections between the nodes of the first two layers. The correct sum should not be passed from the first layer to the second layer because that still makes a SCA possible. Therefore, the first two layers of a neural network are protected where the values that are passed between these layers are either the correct ones or their negated values. The computed weighted sums of the nodes of the second layer are corrected by removing the negations before being passed to nodes of the third layer. Experiments using correlated Hamming weights have shown that the weighted sums for the first two layers as computed no longer leak information in a SCA.

In accordance with an embodiment, there is provided, in a method for protecting a machine learning (ML) model from a side channel attack (SCA), the method executed by a processor in a data processing system, the method including: generating a first random bit; computing a first weighted sum for a first connection between a node of a first layer and a node of a second layer of the ML model, wherein the first weighted sum is equal to a multiplication of the weight of the first connection multiplied by an input to the node of the first layer, wherein one of the weight or the input is negated conditioned on a value of the first random bit; and providing a first output comprising the computed first weighted sum to the node of the second layer. The first layer may be a first layer of a neural network of the ML model and the second layer may be a second layer of the neural network immediately following the first layer. The method may further include adding a first bias to the first weighted sum, wherein the first bias is subjected to the conditional negation based on the value of the first random bit. The method may further include, in the first layer, applying an activation function to the computed first weighted sum, wherein the activation function maps negative values of the first weighted sum to zero if the first random bit is false, maps positive values of the weighted sum to zero if the first random bit is true, and maps negative values of the first weighted sum to the weighted sum if the first random bit is true. The method may further include: generating, in the second layer, a second random bit; computing, in the second layer, a second weighted sum for a second connection of a node of the second layer and a node of a third layer of the ML model, wherein the second weighted sum is equal to a multiplication of a weight of the second connection with a conditional negation of an absolute value of the first weighted sum, the conditional negation of the absolute value of the first output based on a value of the second random bit; providing a second output including the second weighted sum; and applying the conditional negation to the second output based on the value of the second random bit. The method may further include adding a second bias to the computed second weighted sum, wherein the second bias is subjected to the conditional negation conditioned on the value of the second random bit. The conditional negation of the absolute value of the input may be performed in constant time. The method may further include providing a second output including the computed second weighted sum to one or more nodes of the third layer. The input may be an image to be classified by the ML model. The method may be performed during an inference operation of the ML model.

In another embodiment, there is provided, a method for protecting a machine learning (ML) model from a side channel attack (SCA). The method is executed by a processor in a data processing system, the method including: generating a first random bit; computing a first weighted sum for a first connection between a node of a first layer and a node of a second layer of the ML model, wherein the first weighted sum is equal to a multiplication of the weight of the first connection multiplied by an input to the node of the first layer, wherein one of the weight or the input is negated conditioned on a value of the first random bit; and providing a second output comprising the computed first weighted sum to one or more nodes of a second layer of a plurality of layers; generating, in the second layer, a second random bit; computing, in the second layer, a second weighted sum for a second connection of a node of the second layer and a node of a third layer of the ML model, wherein the second weighted sum is equal to a multiplication of a weight of the second connection with a conditional negation of an absolute value of the first weighted sum, the conditional negation of the absolute value of the first output based on a value of the second random bit; and applying a conditional negation to the second weighted sum, the conditional negation of the second weighted sum based on the value of the second random bit. The first layer may be a first layer of a neural network of the ML model and the second layer may be a second layer of the neural network immediately following the first layer. The method may further include adding a first bias to the first weighted sum, wherein the first bias is subjected to the conditional negation based on the value of the first random bit. The method may further include adding a second bias to the computed second weighted sum, wherein the second bias is subjected to the conditional negation based on the value of the second random bit. The method may further include, in the first layer, applying an activation function to the computed first weighted sum, wherein the activation function maps negative values of the first weighted sum to zero if the first random bit is false, maps positive values of the first weighted sum to zero if the first random bit is true, and maps negative values of the first weighted sum to the weighted sum if the first random bit is true. The method may further include, in the second layer, applying an activation function to the computed second weighted sum, wherein the activation function maps negative values of the second weighted sum to zero if the first random bit is false, maps positive values of the second weighted sum to zero if the first random bit is true, and maps negative values of the second weighted sum to the second weighted sum if the first random bit is true. The conditional negation of the absolute value of the input may be performed in constant time. The method may further include providing a second output comprising the computed second weighted sum to one or more nodes of a third layer of the plurality of layers. The input may be an image to be classified by the ML model. The method may be performed during an inference operation of the ML model.

Figure 1:
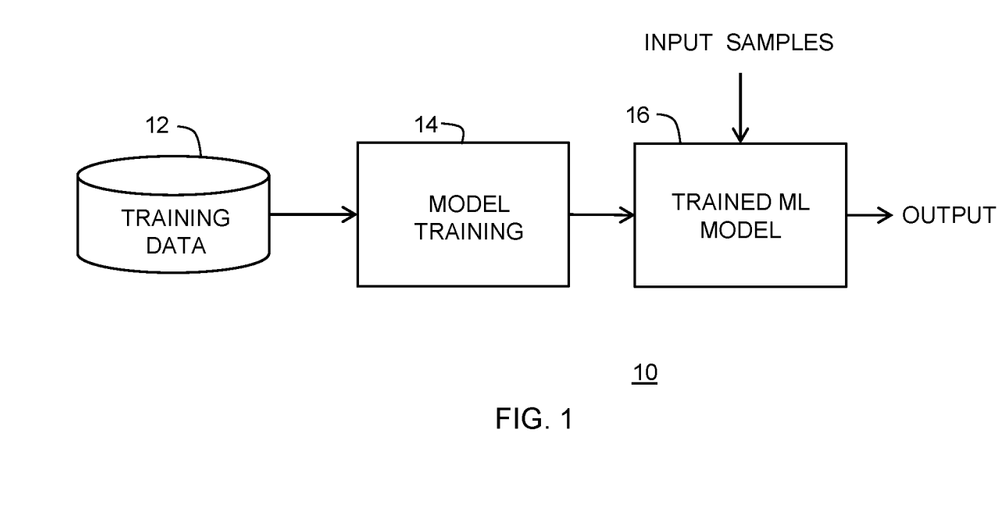
FIG. 1 illustrates a system for training and using a ML model.

FIG. 1 illustrates a simplified system 10 for training and using a ML model. System 10 includes a labeled set of ML training data 12, model training block 14, and resulting trained ML model 16. In one embodiment, system 10 is implemented as a computer program stored on a non-transitory medium comprising executable instructions. One example embodiment includes an artificial neural network (NN) algorithm used in trained ML model 16 to classify images. In one embodiment, trained ML model 16 may be loaded onto an integrated circuit device and used to recognize, for example, road signs. In other embodiments, ML model 16 may be different.

in accordance with an embodiment, the trained ML model to be protected may be a network including convolutional layers, fully connected layers, or other types of layers. Generally, a NN includes one or more input layers, one or more output layers, and one or more intermediate layers between the input and output layers. Each layer can have any number of nodes, or neurons. Typically, each of the nodes includes an activation function. There can be any number of intermediate layers. Each intermediate layer can include any number of nodes and concludes with a last hidden or last intermediate layer before one or more output layers. There can be any number of output nodes in the output layers. Typically, the number of output nodes is equal to the number of classes in a NN used for classification. Neural networks may also be used for other applications, such as object detectors. In one example, an input sample is provided at the input layer of trained ML model 16 and propagates through the network to the output layers. The propagation through the network includes the calculation of values for the layers of the neural network, including the values for the intermediate layers used by the described embodiments. A weighted sum is computed for each node connection. A weighted sum computation is a basic calculation for a NN that includes a multiplication of weight of a connection between nodes with a value communicated over the connection. A bias value may be added to the weighted sum computation. Typically, weights and biases are applied at each of the connections and nodes of the neural network. Generally, a weight at a node determines the steepness of the activation function and the bias at a node delays a triggering of an activation function for each of the nodes. One or more output signals are computed based on the weighted sum of the inputs and outputs from the output nodes. An activation function is applied to each of the weighted sum computations and may include non-linear activation functions. The activation functions, the weights, the biases, and the input to a node defines the output. Training the ML model in model training environment 14 with training dataset 12 results in trained ML model 16. Trained ML model 16 may then be used in inference operations to classify input samples labeled "INPUT" to the nodes of a first layer that propagates to a last output layer and a classification of the input sample labeled "OUTPUT" is provided. An attacker that successfully extracts the weights and biases can recreate the NN.

Figure 2:
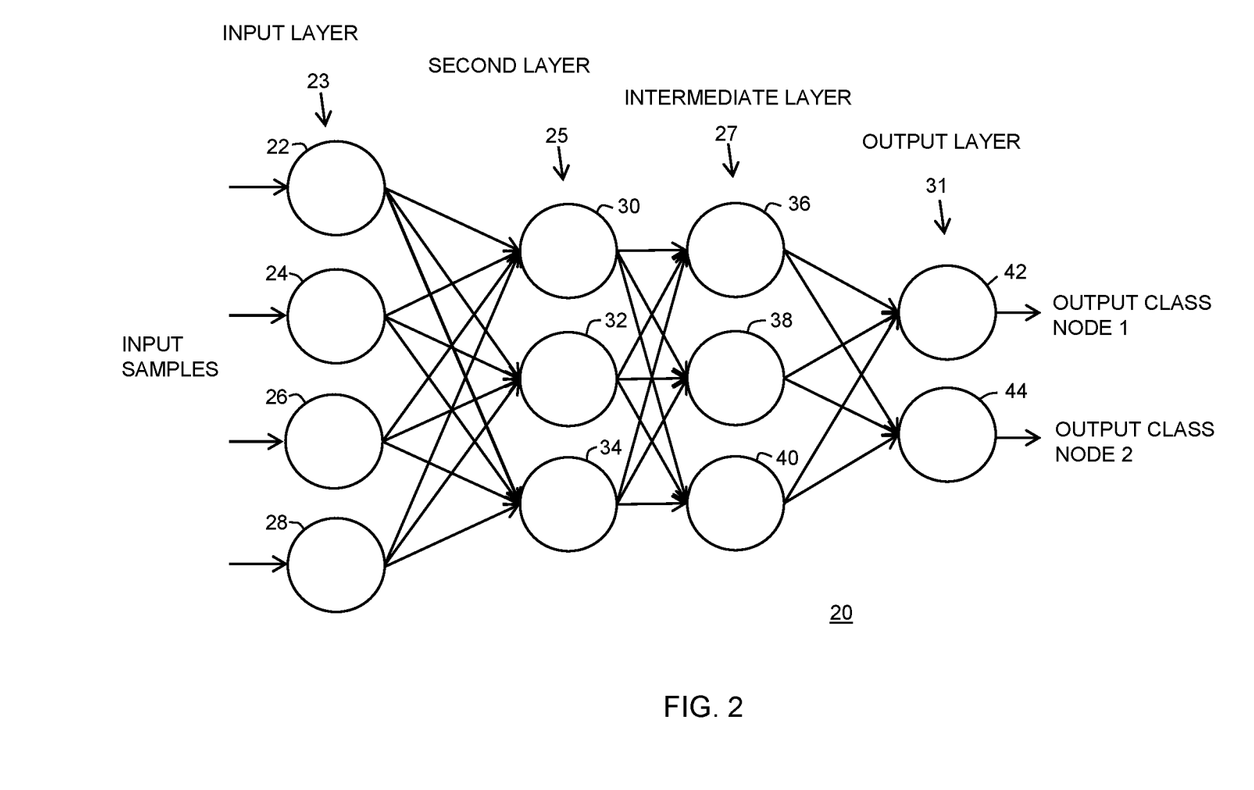
FIG. 2 illustrates an embodiment of a neural network for use in the ML model of FIG. 1.

FIG. 2 illustrates an embodiment of neural network 20 for use in ML model 16 of FIG. 1. Neural network 20 is intended to be a simple representation of a NN for illustration purposes. Neural network 20 includes a plurality of layers, each layer including a plurality of nodes. For example, first layer 23, labeled "FIRST LAYER," includes nodes 22, 24, 26, and 28. Second layer 25, labeled "SECOND LAYER" includes nodes 30, 32, and 34. Intermediate layer 27 includes nodes 36, 38, and 40. Finally, output layer 31 includes output nodes 42 and 44. In the drawings, arrows indicate connections between the nodes. A NN may include any number of layers and any number of nodes. Also, a NN may include more than one input layer, intermediate layer, and output layer. Each of the nodes in output layer 31 corresponds to a prediction class and provides an output classification OUTPUT CLASS NODE 0 and OUTPUT CLASS NODE 1. In other embodiments, there can be a different number of layers and each layer may have a different number of nodes. Input samples labeled "INPUT SAMPLES" are provided to input layer 23. Neural network 20 may be trained to classify images of dogs and cats. Neural network 20 is considered fully connected because it includes all possible nodal connections between each adjacent layer.

Figure 3:
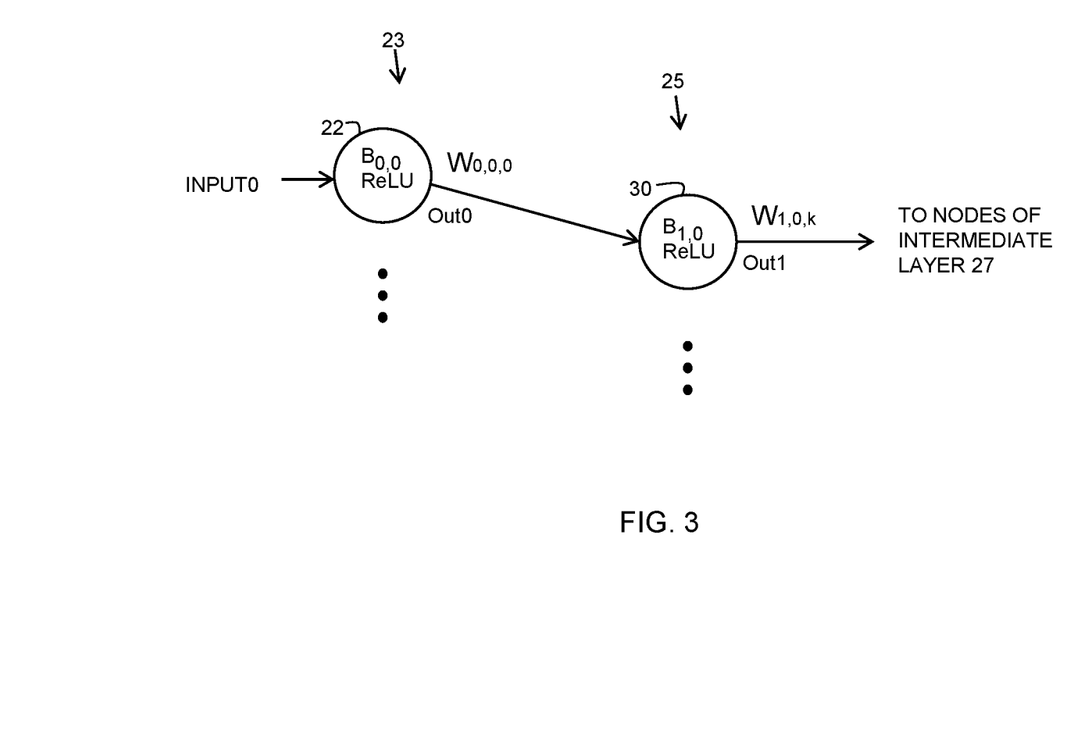
FIG. 3 illustrates a portion of the neural network of FIG. 2.

FIG. 3 illustrates node 22 of first layer 23 and node 30 of second layer 25 of neural network 20 of FIG. 2 in more detail. For simplicity and clarity purposes, only two nodes are illustrated. Each nodal connection between nodes includes a weight "$W_{i,j,k}$", where i is the layer, j is a node in layer i−1, to node k in layer i. For example, for the connection between node 22 and node 30, weight $W_{0,0,0}$ is a weight from node 22 in first layer 23 to node 30 in second layer 25. Weight $W_{1,0,k}$ represents a weight of the connection between node 30 and a node k in intermediate layer 27 in FIG. 2. As can be seen in FIG. 2, node 30 is connected to all the nodes in intermediate layer 27, and each of the connections will have a weight. The values of the weights are determined by training the ML model. Each node also includes an activation function. Various activation functions are available. One of the more commonly used activation functions is the 0 (rectified linear) activation function. Each node in FIG. 2 includes an ReLU activation function as illustrated in FIG. 3. A bias is also added to each of the weighted sum computations. In FIG. 3, a bias has the notation $B_{x,y}$, where x is the layer and y is the node of the layer. For example, a bias for node 22 is labeled $B_{0,0}$ indicating the first node of the first layer. A bias of node 30 is labeled $B_{1,0}$, indicates the bias is for the first node of the second layer.

A weighted sum computation of the connection between node 22 and node 25 would be a multiplication of weight $W_{0,0,0}$ with input INPUT0, Bias $B_{0,0}$ is added to the weighted sum computation and activation function ReLU is applied. An output of the computation is Out0 and is provided to one or more nodes of the second layer including node 30. Likewise, output Out0 is used as the input for weighted sum computations of nodal connections to nodes of intermediate layer 27 from node 30. The activation functions, the weights, the biases, and the input to a node defines the outputs, labeled "OUTPUT CLASS NODE 1" and OUTPUT CLASS NODE 2. Back propagation in the reverse direction through the layers is also possible. The attacker is interested in the values of the weights and the biases.

After training, the ML model is ready to be loaded to a device and used for inference operation, for example, the classification of input samples. In the inference operation, a weighted sum is computed for each node. The following pseudo code shows a conventional basic weighted sum computation that may be used for connections of each of nodes 22, 24, 26, and 28 of first layer 23:
sum=0
for i in 1 to n:

sum+=weight[i]*input[i]

sum+=bias in the above code, the accumulated sum "sum" is first initialized to zero. Next, the code is looped over all n inputs and weights. Each weight is multiplied with the corresponding input and accumulated in the sum variable (+=means 'add to'). The variable n is the number of inputs to a node in the layer. At the end of the computation, a bias term is added to the sum.

The above code is vulnerable to SCA because the power consumption (or electromagnetic emission) of the multiplication can be measured and can be correlated to a simulated power consumption of the known input and a guessed weight. This is done for all possible guesses and the one that gives the highest correlation is likely to be the correct guess and corresponds with the weight that has been used in the computation. Besides attacking the computation via SCA at the point of the multiplication, it is also possible to attack it later in the weighted sum computation.

Two options will be discussed for protecting the computation of the weighted sum against SCA for node connections of the first layer. The first option written in a pseudo code form is named 'cneg on weights':
R=random_bit(i)
sum1=0
for i in 1 to n0:

sum1+=cneg(R,weigh1t[i])*input[i]

sum1+=cneg(R,bias1[i])

First, a random bit R is generated. The random bit R is generated for the weighted sum (sum1) computation of a connection. The random bit R is used to protect the weights and biases by means of a cneg (conditional negation) function. The cneg function is defined as:

cneg(c,v)=if c then−v else v

Depending on c, the cneg function returns −v if c is true and v otherwise. So, in the weighted sum computation above for cneg on weights, the accumulated sum sum1 after adding the bias is either the correct weighted sum (if R=false) or the negated weighted sum (if R=true). In one embodiment, the random bit R may be true when the value of random bit R is "1". An output (out0 in FIG. 3) from node 22 of the first layer 23 including the correct or negated weighted sum is passed to one or more nodes of second layer 25. A corrected weighted sum, by applying a correction, is not passed to the second layer so that an attacker is prevented from successfully determining the weights of the first layer. The weighted sums are corrected at the end of the second layer computations. The last statement for the second layer applies cneg to the weighted sum that is passed to the third layer (see the computations below for node connections of the second layer).

The second option for the first layer weighted sum is called 'cneg on inputs' and is shown below:
R=random_bit(i)
sum1=0
for i in 1 to n0:

sum1+=weight[i]*cneg(R,input[i])

sum1+=cneg(R,bias[i])

Again, the accumulated sum passed to the second layer is either the correct value or its negation depending on random bit R. Experiments have shown that the code above provides protection against SCA.

The two options protect the weighted sum computation but if correct weighted sum values are passed from nodes of the first to nodes of the second layer, then there is still a possibility the model can be attacked via SCA. For example, an attacker could set all inputs of the first layer to zero except for one input. The non-zero input, weighted with its corresponding weight, is then used as input to the second layer on which an attacker can then apply SCA. Therefore, an output from the computations of a node connection, such as Out0, including the weighted sum for node 22 in first layer 23 is computed without the final correction.

Also, in addition to the above computations for nodes of first layer 23, after each weighted sum computation, an ReLU activation function is typically applied to the weighted sum. The conventional ReLU activation function maps negative values to zero. In code the ReLU(x) activation function is:

ReLU(x)=if x>=0then x else0, where x may be the weighted sum of a node.

However, in the SCA protected weighted sum computation according to an embodiment, a modified ReLU activation function is applied to the weighted sum computation that still maps negative values to zero if random bit R is false but maps positive values to zero if random bit R is true and maps negative values of the weighted sum to the weighted sum if the random bit R is true. So ReLU for the SCA protected layer becomes:

ReLU(x)=if(x>=0)xor R then x else0, where xor stands for exclusive-OR.

Then, output out0=sum1≥0xor R?sum1:0, where out0 may be the value computed for the connection between node 22 in first layer 23 and node 30 of second layer 25 and becomes the input to the second layer. The colon (:) means "else".

After the modified ReLU activation function is applied to the weighted sum to compute node output Out0, the node output Out0 value is passed to nodes of second layer 25 including node 30. The node output Out0 value is either the correct value or its negation as determined by the random bit R for that computation. However, in the unprotected case the output of the ReLU function is always positive so the modified ReLU activation function can be corrected in the second layer by taking the absolute value. However, if we do this, the value that we want to hide becomes visible to SCA again. Therefore, 'cneg on inputs' can be used in the second layer and the cneg combined with the absolute value function in a function called cnegabs. The second layer computation may be:

S=random_bit(j)
sum2=0
for j in 1 to n2:

sum2+=weight[j]*cnegabs(S,Out0[j])

sum2+=cneg(S,bias)

sum2=cneg(S,sum2)

The cnegabs function first applies the absolute value function followed by cneg. So, the cnegabs function computes:

cnegabs(c,v)=if c then−|v|else|v|.

However, the cnegabs is implemented as follows to prevent the absolute value of v from making v visible for SCA:

cnegabs(c,v)=if(v<0)xor c then−v else v.

The cnegabs function should be implemented in constant time so that simple power analysis (SPA), a type of SCA, or timing attacks cannot discover c and the sign of v. In one embodiment as described, c is a randomly generated bit and v is an input to a protected layer. Instruction sets such as the Aarch64 (64 bit ARM cores) provide support for the cnegabs function. The modified ReLU activation function may also be applied to second layer 25. When the first two layers are protected against SCA as explained above, the attacker can no longer control the inputs of the third layer and therefore it is believed that SCA on the third and successive layers would be impossible, or at least very difficult.

Figure 4:
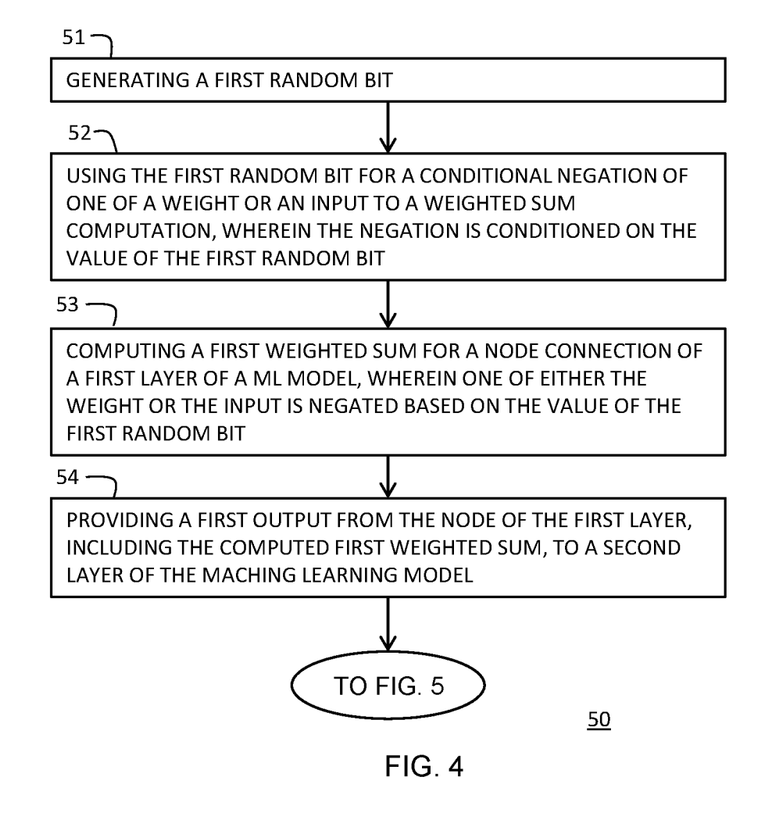
FIG. 4 and FIG. 5 illustrate methods for protecting a ML model from a SCA in accordance with an embodiment.
Figure 5:
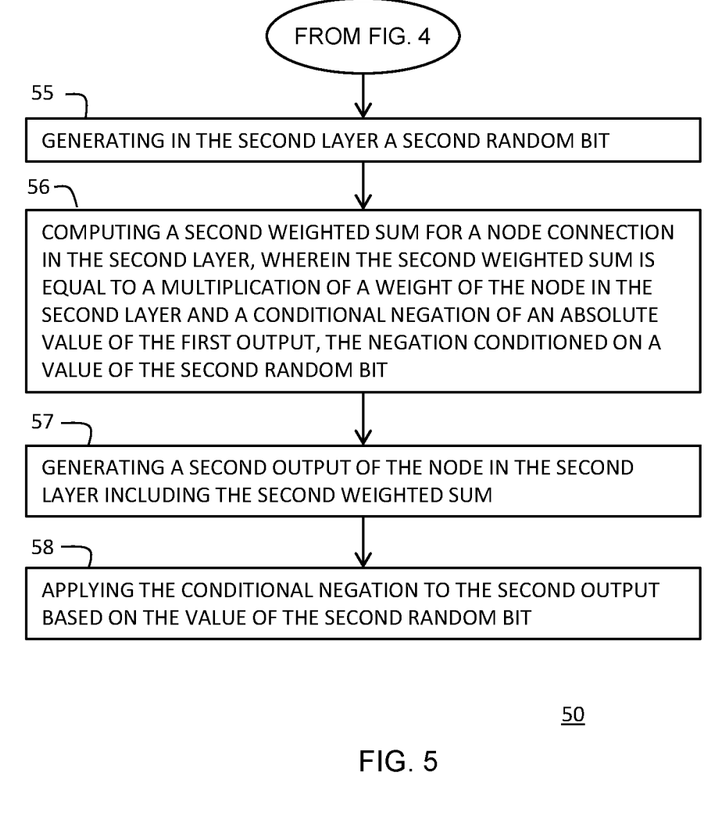

FIG. 4 and FIG. 5 illustrate a method for protecting a ML model from a SCA in accordance with an embodiment. As an example, FIG. 4 illustrates a method for performing a weighted sum computation for the nodes of first layer 23 of NN 20 as illustrated in FIG. 2 and FIG. 3. The weighted sum computations may be performed during inference operations of trained ML model 16, where trained ML model 16 is implemented in a device. The method begins at step 51. At step 51, a first random bit is generated. The first random bit will have either a true or false state depending on a value of the bit. For example, the true state may be represented by a "1" value and the false state may be represented by a "0" value. At step 52, the first random bit is used for a conditional negation of one of a weight or an input of a node of the weighted sum computation. Weighted sums are computed for each node connection of first layer 23 using a different random bit R for each weighted sum computation. At step 53, a first weighted sum is computed for a node connection of first layer 23. Either the weight or the input is negated based on a value of the first random bit. In one embodiment, if the value of the first random bit is true, then one of either the weight or the input is negated before being multiplied together. However, if the first random bit is false, then neither of the weight or input is negated and the weighted sum computation returns the correct value. A new random bit is generated for each node of first layer 23 so that some of the weighted sum computations are correct, and some are negated. After the weighted sum computation, a bias may be added, and an activation function may be applied to the weighted sum to produce an output. At step 54, a first output including the first weighted sum is provided from the first layer and becomes an input to second layer 25.

FIG. 5 illustrates an example weighted sum computation for the nodes of second layer 25 of NN 20 as illustrated in FIG. 2 and FIG. 3. The method continues at step 55 from step 54 of FIG. 4. At step 55, a second random bit is generated. The second random bit will be used for computations for a node connection of second layer 25. As mentioned above for the first layer, a new random bit will be generated for the computations of each nodal connection in the second layer. At step 56, a second weighted sum is computed for a node connection of the second layer 25. The second weighted sum is equal to a multiplication of a weight of the connection in the second layer and a conditional negation of an absolute value of the first output provided from the first layer 23. The conditional negation of the absolute value is described above in the description of FIG. 3 as "cnegabs" and is conditional on a value of the second random bit. At step 57, a second output including the weighted sum is provided. A bias and activation function may also be applied to the second weighted sum. Because only the first two layers of the NN need to be protected, the negated weighted sums of the second layer (such as second layer 25 in FIG. 2) are negated again, so that the correct value is passed to the next layer in the NN. For example, in NN 20 of FIG. 2, the next layer after second layer 25 is intermediate layer 27.

Figure 6:
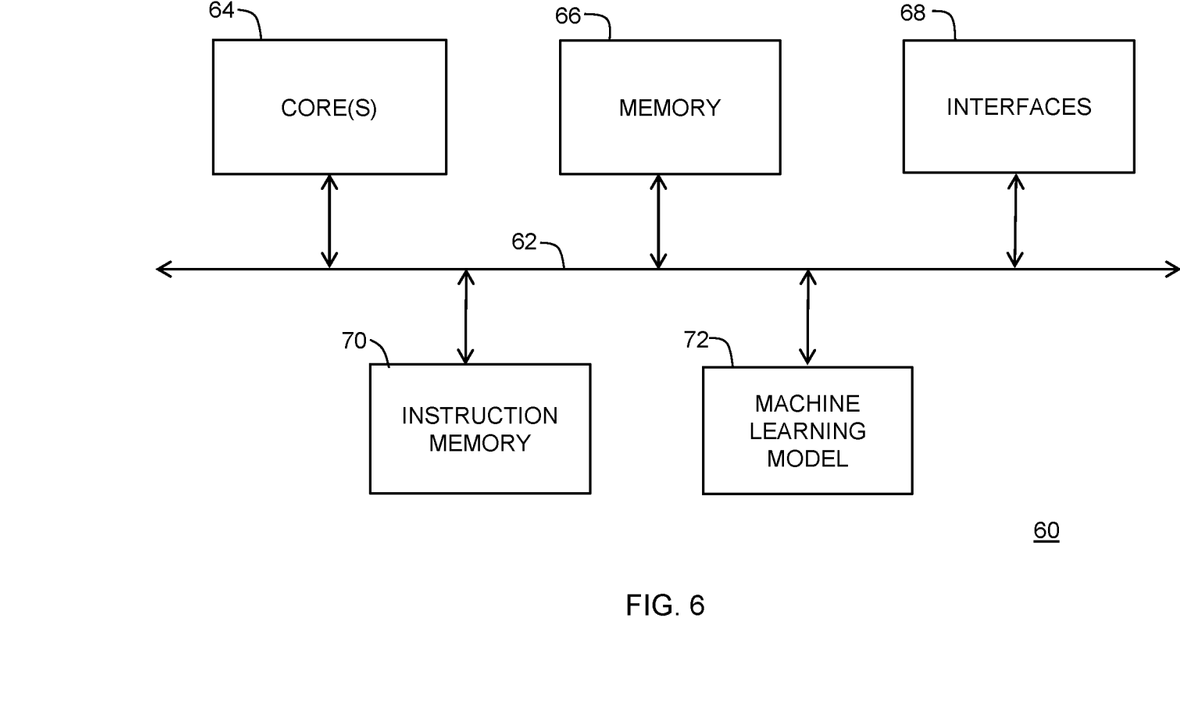
FIG. 6 illustrates a processor useful for implementing the methods of FIG. 4 and FIG. 5 in accordance with an embodiment.

FIG. 6 illustrates data processing system 60 for use in implementing the described method for protecting an ML model in accordance with an embodiment. Data processing system 60 may be implemented on one or more integrated circuits. Data processing system 60 includes bus 62. In other embodiments, bus 62 may be a switching network or other form of interconnection for communication between modules. Connected to bus 62 is one or more processor cores 64, memory 66, interfaces 68, instruction memory 70, and ML model 72. The one or more processor cores 64 may include any hardware device capable of executing instructions stored in memory 66 or instruction memory 70. For example, processor cores 64 may execute the ML algorithms used for training and operating ML model 72. Processor cores 64 may be, for example, a microprocessor, field programmable gate array (FPGA), application-specific integrated circuit (ASIC), or similar device. Processor cores 64 may be implemented in a secure hardware element and may be tamper resistant.

Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. In one embodiment, memory 66 is used to store weights and biases for the ML model. Memory 66 may be a secure memory and may be used to store the ML model.

Interfaces 68 may be connected to one or more devices for enabling communication with a user such as an administrator. For example, user interface 68 may be enabled for coupling to a display, a mouse, a keyboard, or other input/output device. Interfaces 68 may include one or more devices for enabling communication with other hardware devices. For example, interfaces 68 may include, or be coupled to, a network interface card (NIC) configured to communicate according to the Ethernet protocol. Also, interfaces 68 may implement a TCP/IP stack for communication according to the TCP/IP protocols. Data samples for classification by ML model 72 may be input via interfaces 68, or similar interfaces. Various other hardware or configurations for communicating are available.

Instruction memory 70 may include one or more machine-readable storage media for storing instructions for execution by processor cores 64. In other embodiments, both memories 66 and 70 may store data upon which processor cores 64 may operate. Memories 66 and 70 may also store, for example, encryption, decryption, and verification applications used to protect sensitive ML model 72. Memories 66 and 70 may be implemented in a secure hardware element and be tamper resistant.

Machine learning model 72 may include trained ML model 16 of FIG. 1 with include NN 20 of FIG. 2. Machine learning model 72 may run on one or more of processor cores 64 or run on its own co-processor (not shown). Also, in one embodiment, ML model 72 may be stored in its own dedicated secure storage or stored encrypted in an unsecure memory such as memory 66.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, edge device in an internet of things (IOT) system, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a machine learning (ML) model from a side channel attack (SCA), the method executed by a processor in a data processing system, the method comprising:

generating a first random bit;

computing a first weighted sum for a first connection between a node of a first layer and a node of a second layer of the ML model, wherein the first weighted sum is equal to a multiplication of the weight of the first connection multiplied by an input to the node of the first layer, wherein one of the weight or the input is negated conditioned on a value of the first random bit; and providing a first output comprising the computed first weighted sum to the node of the second layer generating, in the second layer, a second random bit;

computing, in the second layer, a second weighted sum for a second connection of a node of the second layer and a node of a third layer of the ML model, wherein the second weighted sum is equal to a multiplication of a weight of the second connection with a conditional negation of an absolute value of the first weighted sum, the conditional negation of the absolute value of the first output based on a value of the second random bit;

providing a second output comprising the second weighted sum; and applying the conditional negation to the second output based on the value of the second random bit.

2. The method of claim 1, wherein the first layer is a first layer of a neural network of the ML model and the second layer is a second layer of the neural network immediately following the first layer.

3. The method of claim 1, further comprising adding a first bias to the first weighted sum, wherein the first bias is subjected to the conditional negation based on the value of the first random bit.

4. The method of claim 1, further comprising, in the first layer, applying an activation function to the computed first weighted sum, wherein the activation function maps negative values of the first weighted sum to zero if the first random bit is false, maps positive values of the weighted sum to zero if the first random bit is true, and maps negative values of the first weighted sum to the weighted sum if the first random bit is true.

5. The method of claim 1, further comprising adding a second bias to the computed second weighted sum, wherein the second bias is subjected to the conditional negation conditioned on the value of the second random bit.

6. The method of claim 1, wherein the conditional negation of the absolute value of the input is performed in constant time.

7. The method of claim 1, further comprising providing a second output comprising the computed second weighted sum to one or more nodes of the third layer.

8. The method of claim 1, wherein the input is an image to be classified by the ML model.

9. The method of claim 1, wherein the method is performed during an inference operation of the ML model.

10. A method for protecting a machine learning (ML) model from a side channel attack (SCA), the method executed by a processor in a data processing system, the method comprising:
generating a first random bit;
computing a first weighted sum for a first connection between a node of a first layer and a node of a second layer of the ML model, wherein the first weighted sum is equal to a multiplication of the weight of the first connection multiplied by an input to the node of the first layer, wherein one of the weight or the input is negated conditioned on a value of the first random bit; and
providing a first output comprising the computed first weighted sum to one or more nodes of a second layer of a plurality of layers;
generating, in the second layer, a second random bit;
computing, in the second layer, a second weighted sum for a second connection of a node of the second layer and a node of a third layer of the ML model, wherein the second weighted sum is equal to a multiplication of a weight of the second connection with a conditional negation of an absolute value of the first weighted sum, the conditional negation of the absolute value of the first output based on a value of the second random bit; and applying a conditional negation to the second weighted sum, the conditional negation of the second weighted sum based on the value of the second random bit.

11. The method of claim 10, wherein the first layer is a first layer of a neural network of the ML model and the second layer is a second layer of the neural network immediately following the first layer.

12. The method of claim 10, further comprising adding a first bias to the first weighted sum, wherein the first bias is subjected to the negation based on the value of the first random bit.

13. The method of claim 10, further comprising adding a second bias to the computed second weighted sum, wherein the second bias is subjected to the conditional negation based on the value of the second random bit.

14. The method of claim 10, further comprising, in the first layer, applying an activation function to the computed first weighted sum, wherein the activation function maps negative values of the first weighted sum to zero if the first random bit is false, maps positive values of the first weighted sum to zero if the first random bit is true, and maps negative values of the first weighted sum to the weighted sum if the first random bit is true.

15. The method of claim 10, further comprising, in the second layer, applying an activation function to the computed second weighted sum, wherein the activation function maps negative values of the second weighted sum to zero if the first random bit is false, maps positive values of the second weighted sum to zero if the first random bit is true, and maps negative values of the second weighted sum to the second weighted sum if the first random bit is true.

16. The method of claim 10, wherein the conditional negation of the absolute value of the input is performed in constant time.

17. The method of claim 10, further comprising providing a second output comprising the computed second weighted sum to one or more nodes of a third layer of the plurality of layers.

18. The method of claim 10, wherein the input is an image to be classified by the ML model.

19. The method of claim 10, wherein the method is performed during an inference operation of the ML model.

* * * * *